United States Patent
Baron et al.

(10) Patent No.: US 8,010,656 B2
(45) Date of Patent: Aug. 30, 2011

(54) METHOD AND APPARATUS FOR DYNAMICALLY GRANTING OR DENYING ACCESS TO AN ELECTRONIC CALENDAR

(75) Inventors: Joseph G. Baron, Raleigh, NC (US); Frank Battaglia, Raleigh, NC (US); Jerrold Martin Heyman, Raleigh, NC (US); Michael Leonard Nelson, Raleigh, NC (US); Andrew Geoffrey Tonkin, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 11/776,985

(22) Filed: Jul. 12, 2007

(65) Prior Publication Data

US 2009/0019050 A1    Jan. 15, 2009

(51) Int. Cl.
*G06F 15/16* (2006.01)
*G06F 15/173* (2006.01)

(52) U.S. Cl. ........ 709/224; 709/217; 709/218; 709/219; 709/225

(58) Field of Classification Search ........... 709/223–226
See application file for complete search history.

(56) References Cited

U.S. PATENT DOCUMENTS

| | | | |
|---|---|---|---|
| 6,473,794 B1* | 10/2002 | Guheen et al. ........... 709/223 |
| 6,615,166 B1* | 9/2003 | Guheen et al. ........... 703/27 |
| 6,721,713 B1* | 4/2004 | Guheen et al. ........... 705/1.1 |
| 6,754,665 B1* | 6/2004 | Futagami et al. ........... 707/102 |
| 6,785,868 B1 | 8/2004 | Raff | |
| 6,829,609 B1* | 12/2004 | Wagner ........... 707/8 |
| 6,839,735 B2* | 1/2005 | Wong et al. ........... 709/204 |
| 7,315,826 B1* | 1/2008 | Guheen et al. ........... 705/7.29 |
| 2001/0042126 A1* | 11/2001 | Wong et al. ........... 709/229 |
| 2003/0046296 A1 | 3/2003 | Doss | |
| 2004/0054931 A1 | 3/2004 | Himmel | |
| 2005/0114777 A1 | 5/2005 | Szeto | |
| 2005/0233743 A1* | 10/2005 | Karaoguz et al. ........... 455/432.3 |
| 2006/0041655 A1* | 2/2006 | Holloway et al. ........... 709/223 |
| 2006/0123008 A1 | 6/2006 | Stillion | |
| 2006/0161853 A1 | 7/2006 | Chen | |
| 2006/0190547 A1 | 8/2006 | Bhogal | |
| 2008/0040188 A1* | 2/2008 | Klausmeier ........... 705/9 |
| 2008/0082538 A1* | 4/2008 | Meijer et al. ........... 707/9 |
| 2008/0104408 A1* | 5/2008 | Mayer ........... 713/178 |
| 2008/0250480 A1* | 10/2008 | Meshkat ........... 726/6 |

* cited by examiner

*Primary Examiner* — Firmin Backer
*Assistant Examiner* — Keyvan Emdadi
(74) *Attorney, Agent, or Firm* — Matt Talpis; Mark P Kahler

(57) ABSTRACT

A calendar system includes a calendar requester client and a calendar owner client that couple to a calendar server via one or more networks therebetween. In one embodiment, when the calendar server denies a particular calendar requester access to the calendar owner's calendar, the calendar server transmits a denial notice to the calendar owner and allows the calendar owner to dynamically add the particular calendar requester to a list of approved requesters on the calendar server.

12 Claims, 9 Drawing Sheets

FIG. 2

| FILE | EDIT | VIEW | ACTION | TOOLS | WINDOW | HELP | | | | 205 _ □ X |
|---|---|---|---|---|---|---|---|---|---|---|

| CALENDAR FOR JAN SCHMIDT | GETTING STARTED | CONTACTS | MAIL | CALENDAR — 410 | | | |
|---|---|---|---|---|---|---|---|
| ◀ JANUARY 2007 ▶ | | 30 Mon Jan, 2007 | 1 Tues Jan, 2007 | 2 Wed Jan, 2007 | 3 Thurs Jan, 2007 | 4 Fri Jan, 2007 |
| S M T W T F S | 08:00 am | | | | | |
| 29 30 1 2 3 4 5 | | | | | | |
| 6 7 8 9 10 11 12 | 9:00 | | | | | |
| 13 14 15 16 17 18 19 | | | | | | |
| 20 21 22 23 24 25 26 | 10:00 | | | | | |
| 27 28 29 30 31 1 2 | | | | | | |
| | 11:00 | | | | | |
| | 12:00 pm | | | | | |
| | 1:00 | | | | | |
| | 2:00 | | | | | |
| | 3:00 | | | | | |
| | 4:00 | | | | | |

Type: Meeting
Subject: Review Technology Road Map
Leader: Jan Schmidt

215 — SELECT PARTICIPANTS

210
Starts: Start Date | Start Time
Ends: End Date | End Time

FIG. 3A

REQUEST FORM

Request TO: John Participant (CO1), Sally Particpant (CO2)
Type: Meeting
Subject: Review Technology Road Map
Requester: Joe Requester (R1)
(Leader)

Starts: TUES, Jan. 1    10 AM
Ends: TUES, Jan. 1    11 AM

FIG. 3B

GRANT ACCESS TO CALENDAR

| CALENDAR FOR: JOHN PARTICIPANT (C01) 320 | | 30 Mon Jan, 2007 | 1 Tues Jan, 2007 | 2 Wed Jan, 2007 | 3 Thurs Jan, 2007 | 4 Fri Jan, 2007 |
|---|---|---|---|---|---|---|
| ◀ JANUARY 2007 ▶ S M T W T F S 29 30 1 2 3 4 5 6 7 8 9 10 11 12 13 14 15 16 17 18 19 20 21 22 23 24 25 26 27 28 29 30 31 1 2 | 08:00 am | | FREE | | | |
| | 9:00 | | DEPT. MEETING | | | |
| | 10:00 | | FREE | | | |
| | 11:00 | | FREE | | | |
| | 12:00 pm | | FREE | | | |
| | 1:00 | | FREE | | | |
| | 2:00 | | CONF. CALL 1 | | | |
| | 3:00 | | CONF. CALL 2 | | | |
| | 4:00 | | FREE | | | |

FIG. 3C

DENIAL NOTICE SENT TO REQUESTER

| CALENDAR FOR: JOHN PARTICIPANT (CO1) | | STATUS: | ACCESS DENIED; REQUEST FOR ACCESS SENT TO CALENDAR OWNER (JOHN PARTICIPANT-CO1) WAITING FOR RESPONSE | | | | | | |
|---|---|---|---|---|---|---|---|---|---|
| ◀ JANUARY 2007 ▶ <br> S M T W T F S <br> 29 30 1 2 3 4 5 <br> 6 7 8 9 10 11 12 <br> 13 14 15 16 17 18 19 <br> 20 21 22 23 24 25 26 <br> 27 28 29 30 31 1 2 | | | 30 Mon Jan, 2007 | 1 Tues Jan, 2007 | 2 Wed Jan, 2007 | 3 Thurs Jan, 2007 | 4 Fri Jan, 2007 |
| | | 08:00 am | | DENY | | | |
| | | 9:00 | | DENY | | | |
| | | 10:00 | | DENY | | | |
| | | 11:00 | | DENY | | | |
| | | 12:00 pm | | DENY | | | |
| | | 1:00 | | DENY | | | |
| | | 2:00 | | DENY | | | |
| | | 3:00 | | DENY | | | |
| | | 4:00 | | DENY | | | |

330 — (calendar label)
335 — (status label)

FIG. 3D DENIAL NOTICE SENT TO CALENDAR OWNER (REQUEST FOR ACCESS)

METHOD AND APPARATUS FOR DYNAMICALLY GRANTING OR DENYING ACCESS TO AN ELECTRONIC CALENDAR

TECHNICAL FIELD OF THE INVENTION

The disclosures herein relate generally to calendaring systems, and more particularly to the control of access of calendars in electronic calendaring systems.

BACKGROUND

Calendar software tends to be very restrictive in granting access to a calendar owner's calendar. While many calendar software systems allow a calendar owner to grant full access to any requester within a business entity or organization, they may also require the calendar owner to explicitly grant access to each individual requester that desires access to the owner's calendar. The calendar owner may grant access to the owner's calendar by placing a requester's name on an approved access list that a calendar server maintains. It is up to the calendar owner to place a requester's name on the approved access list prior to an access request by a requester. In this manner, the calendar server will accept later requests by the requester to access the owners' calendar. Unfortunately, it is impossible for the typical calendar owner to know in advance everyone who may desire or need access to the owner's calendar in the future. Moreover, it is typically a cumbersome process to load a calendar application, retrieve the approved access list, update the access list with a new approved requester, save the updated list and instruct the requester that the approval process is complete.

What is needed is a method of granting or denying access to an electronic calendar that addresses the problems described above.

SUMMARY

Accordingly, in one embodiment, a method of accessing a calendar is disclosed that includes transmitting to a calendar server, by a calendar requester client, a first request for access to a calendar of a calendar owner that is stored on the calendar server. The method also includes transmitting to the calendar requester client, by the calendar server, a first denial notice that the first request for access is denied or a grant notice that the first request for access is granted. The method further includes transmitting to a calendar owner client, by the calendar server, a second denial notice if the second transmitting step transmits the first denial notice to the calendar requester client, the second denial notice including a second request for access to the calendar of the calendar owner.

In another embodiment, a calendar system is disclosed that includes a calendar owner client associated with a calendar owner. The calendar system also includes a calendar server, coupled to the calendar owner client, that stores a calendar of the calendar owner. The calendar system further includes a calendar requester client, coupled to the calendar server, the calendar requester client being configured to transmit a first request for access to the calendar of the calendar owner that is stored on the calendar server. The calendar server is configured to transmit to the calendar requester client a first denial notice that the first request for access is denied or a grant notice that the first request for access is granted. The calendar server is further configured to transmit to the calendar owner client a second denial notice if the calendar server transmits the first denial notice to the calendar requester client, the second denial notice including a second request for access to the calendar of the calendar owner.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 2 is representation of a window in a calendar client application wherein a requester may select meeting participants who are calendar owners.

FIG. 3A is a representation of a request form in a calendar client application wherein a requester may request the calendar of a meeting participant or calendar owner.

FIG. 3B is a representation of a calendar owner's calendar that the requester receives when a calendar server grants access to that calendar.

FIG. 3C is a representation of a calendar owner's calendar, namely a first denial notice, that the requester receives when a calendar server denies access to that calendar.

FIG. 3D is a representation of a calendar owner's calendar, namely a second denial notice, that the calendar owner receives when a calendar server denies access to that calendar.

DETAILED DESCRIPTION

Figure 1:
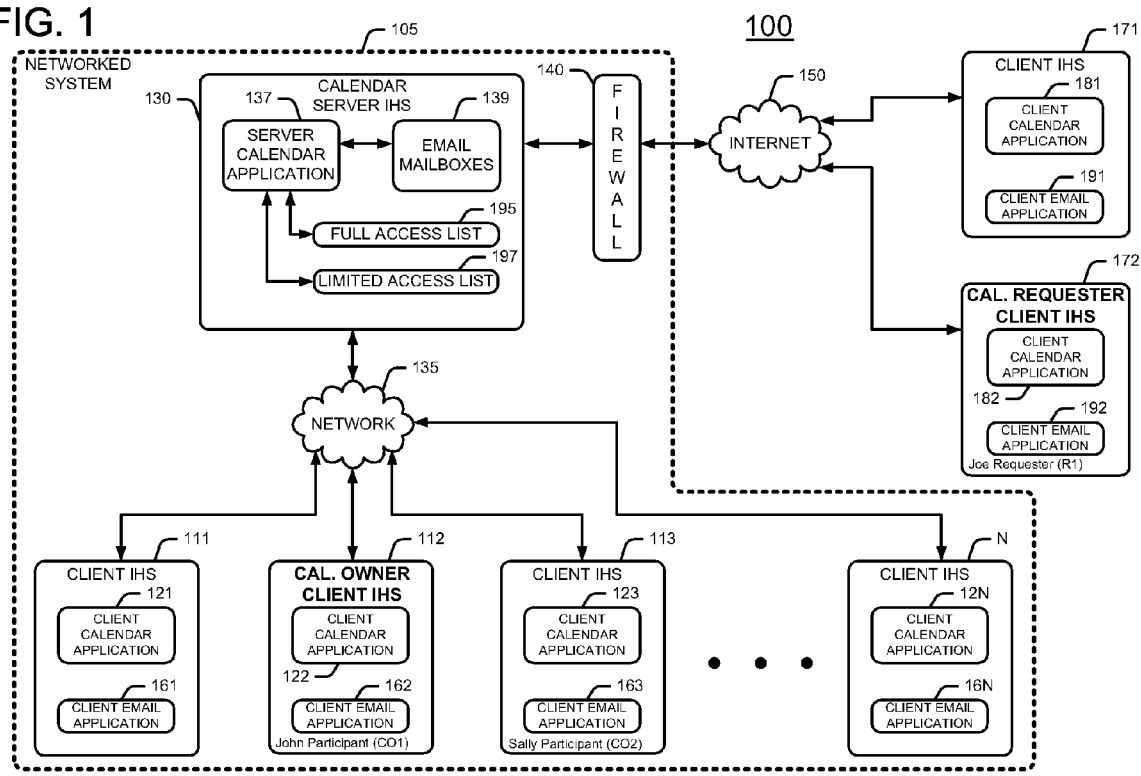
FIG. 1 is a block diagram of the disclosed calendar system.

FIG. 1 is a block diagram of one embodiment of the disclosed calendar system 100. System 100 includes a number of server information handling systems (IHSs) and a number of client IHSs. In actual practice, these IHSs may take many forms. For example, an IHS may take the form of a desktop, portable, laptop, notebook, minicomputer or mainframe computer or other form factor computer or data processing system. An IHS may also take other form factors such as a gaming device, a personal digital assistant (PDA), a portable telephone device, a communication device or other devices that include a processor and memory.

In the representative system 100 of FIG. 1, system 100 includes a networked system 105 within a particular organization or business entity, as well as IHSs external to the organization or business entity. Networked system 105 includes client IHSs 111, 112, 113 ... N, wherein N is the total number of IHSs in networked system 105. Client IHSs 111, 112, 113 ... N respectively include client calendar applications 121, 122, 123, ... 12N that each communicate with a calendar server IHS 130 via a network 135 therebetween, as shown in FIG. 1. Calendar server IHS 130 includes server calendar application 137 and email mailboxes 139. Mailboxes 139 include a respective server mailbox for each of client IHSs 111, 112, 113 ... N. Networked system 105 further includes a firewall 140 that couples the server IHS 130 to the Internet 150. In this manner, client IHSs 111, 112, 113 ... N and the server IHS 130 may communicate with other server IHSs and client IHSs external to the organization or business entity to which networked system 105 corresponds. The dashed line 105 in FIG. 1 corresponds not only to networked system 105 but also to the organization or business entity that employs networked system 105. Client IHSs 111, 112, 113 . . . N respectively include client email applications 161, 162, 163 and 16N that communicate via network 135 with email mailboxes 139 and a server email application (not shown) in server IHS 130. In this manner, client IHSs 111, 112, 113 . . . N may communicate among one another and with external IHSs via email.

System 100 also includes client IHSs 171 and 172 that are external to the networked system or organization 105. Client IHSs 171 and 172 couple to the Internet 150 as shown in FIG. 1. Client IHS 171 includes client calendar application 181 and client email application 191. Client IHS 172 includes client calendar application 182 and client email application 192. In the following example, client IHS 172 acts as a requester of calendar information of the calendar owner of client IHS 112. Client IHS 172 is thus calendar requester client IHS 172, and client IHS 112 is thus calendar owner client IHS 112.

FIG. 2 shows an example of a calendar window 205 that client calendar application 182 generates at calendar requester client IHS 172 when a requester at client IHS 172 desires to schedule a meeting, select participants for the meeting and access the respective calendars of the selected participants. Each selected participant in this example maintains a calendar in server calendar application 137 of calendar server IHS 130 of FIG. 1. Thus, each selected participant is a calendar owner. In this example, the calendar requester at calendar requester client IHS 172 selects a start date, end date, start time and end time for a meeting in meeting time selection box 210. The calendar requester then selects participants, namely calendar owners, by clicking on Select Participants box 215.

FIG. 3A shows a request form 300 that appears on calendar requester client IHS 172 in response to selecting the Select Participants box 215 of FIG. 2. The requester who operates requester client 172 types the names of the desired meeting participants into Request To box 305 as shown. In this particular example, the requester types in "John Participant and Sally Participant" into Request To box 305. John Participant is calendar owner 1 (CO1), namely the user of calendar owner client 112. Sally Participant is calendar owner 2 (CO2), namely the user of calendar owner client 113. The request form 300 includes the requester's name (Joe Requester), namely R1 at requester label 310. After the requester completes request form 300 with participants' (calendar owners') names, the requester sends the completed request to server calendar application 137 of server IHS 130 by selecting SEND button 315. For example, the requester may click on SEND button 315 to send the completed request form 300. For simplicity, the following discussion refers to the methodology for handling requests to access John Participant's calendar on calendar server 130. However, the discussion applies to requests to other participants or calendar owners as well.

FIG. 3B shows a grant access window 320 that client calendar application 182 generates on calendar requester client IHS 172 in cooperation with server calendar application 137, when calendar server application 137 grants access to John Participant's calendar as calendar owner. In this particular embodiment, server IHS 130 stores two types of access lists, namely full access lists 195 and limited access lists 197. A full access list 195 includes the names of all requesters that a particular calendar owner previously approves or grants permission to view the owner's calendar. In a full access list, the calendar owner places no time limitation on the approval for calendar access. A limited access list 197 includes the names of requesters that a particular calendar owner gives permission to view the owner's calendar, but only for a predetermined limited time duration. For example, the time duration may be a day, a month, a year, a single view (one-time-only), or other time duration.

In more detail, server calendar application 137 in calendar server 130 receives the completed request form 300. The completed request form 300 includes the requester's name (Joe Requester—R1) and the calendar owner's name (John Participant—CO1) whose calendar the requester seeks to access. When server calendar application 130 receives the completed request form 300, server calendar application 130 accesses the full access list 195 corresponding to the particular calendar owner that is the subject of the request. If full access list 195 includes that calendar requester's name, then server calendar application 137 grants the requester access to the calendar owner's calendar information. Client calendar application 182 receives this calendar information in requester client IHS 172 and, in response, displays a grant access window 320 such as shown in FIG. 3B. In this particular example, grant access window 320 shows the calendar owner's calendar for the particular day that the completed request form specified. Grant access window 320 may specify more days of calendar information if desired.

If full access list 195 does not include that calendar requester's name specified in the completed request form 300, then server calendar application 137 accesses limited access list 197 to determine if the calendar requester's name is on that list. Server calendar application 137 performs a check daily or more frequently to determine if the respective time period specified for each requester on the limited access list 197 expired. Upon such expiration, server calendar application 137 removes any requester with an expired access time period from the limited access list 197. If server calendar application 137 determines that the requester which request form 300 specifies is still present in limited access list 197, then server calendar application 137 grants access to the calendar owner's calendar and sends the corresponding calendar information to client calendar application 182. Client calendar application 182 receives this calendar information in requester client IHS 172 and, in response, displays grant access window 320 as shown in FIG. 3B.

FIG. 3C shows the deny access to calendar window notice 330 that client calendar application 182 generates on calendar requester client IHS 172 in cooperation with server calendar application 137 when calendar server application 137 denies access to John Participant's calendar as calendar owner. This denial occurs when server calendar application 137 does not find the requester's name in either full access list 195 or limited access list 197. Calendar window 330 includes a DENY response in each of the time slots of the specified date for the meeting or event in the request, namely Tuesday in this particular example. Calendar window notice 330 includes a status box 335. In this case, the status box 335 reads "Access denied; Denial Notice/Request for Access Sent to Calendar Owner (John Participant-CO1); Waiting For Response". In other words, not only does the requester receive a denial notice, but the calendar owner receives a different denial notice as explained below.

FIG. 3D shows a denial notice window 340 that calendar owner client IHS 112 displays in response to server calendar application 137 denying the requester access to the calendar associated with calendar owner client IHS 112. This denial notice includes a request for access that server calendar application 137 generates in response to the denial. In response to this request for access, in this particular embodiment, the calendar owner of client IHS 172 may select one of 3 options. First, the calendar owner may select as a response the "Grant Full Access" radio button 345 as shown by the corresponding darkened radio button in FIG. 3D. When the calendar owner of client IHS 112 selects "Grant Full Access" radio button 345 and selects SEND button 360, this action adds the requester associated with denial notice 340, namely the requester (Joe Requester) at client IHS 172, to full access list 195. Any requester name on full access list 195 receives access to the calendar owner's calendar at any time. When server IHS 130 adds the requester's name to full access list 195, server 130 notifies requester IHS 172 of this addition. Server IHS 130 may transmit this notice via email or via a pop-up message that appears in the client calendar application 182 of requester IHS 172.

Alternatively, if the calendar owner does not want to grant full access to the requester, then the calendar owner may optionally select "Grant Limited Access" radio button 350. When the calendar owner selects radio button 350 and selects SEND button 360, server calendar application 137 adds the requester's name to limited access list 197. This grants calendar access to the requester for a limited period of time, for example, one day, one week, one year or other period of time that the calendar owner may select. When server IHS 130 adds the requester's name to limited access list 195, calendar server IHS 130 notifies requester client IHS 172 of this addition. Calendar server IHS 130 may transmit this notice via email or via a pop-up message that appears in the client calendar application 182 of requester client IHS 172. Server calendar application 137 checks daily to determine if the respective access time of each requester on list 197 expired. As each requester's limited access time expires, server calendar application 137 deletes such expired requesters from limited access list 197. In one embodiment, the calendar owner may select a "one time only" option that grants access to the calendar owner's calendar a single time.

In response to the request for calendar access by the requester of client IHS 172, the calendar owner of client IHS 112 may also select a deny access option. To do so, the calendar owner selects "Deny" radio button 355 and selects SEND button 360. In response to this selection, client IHS 112 or calendar server IHS 130 transmits a "calendar access rejected" message to requester client IHS 172. In this scenario, server calendar application 137 adds the requester's name into neither full access list 195 nor limited access list 197, but instead dynamically denies access at the instruction of the calendar owner. This denial of access is in contrast to the scenarios above wherein the calendar owner selects either "Grant Full Access" radio button 345 or "Grant Limited Access" radio button 350 to dynamically allow access to the calendar owner's calendar after an initial denial. In this manner, the disclosed methodology provides for dynamically controlling access to an electronic calendar.

Figure 4:
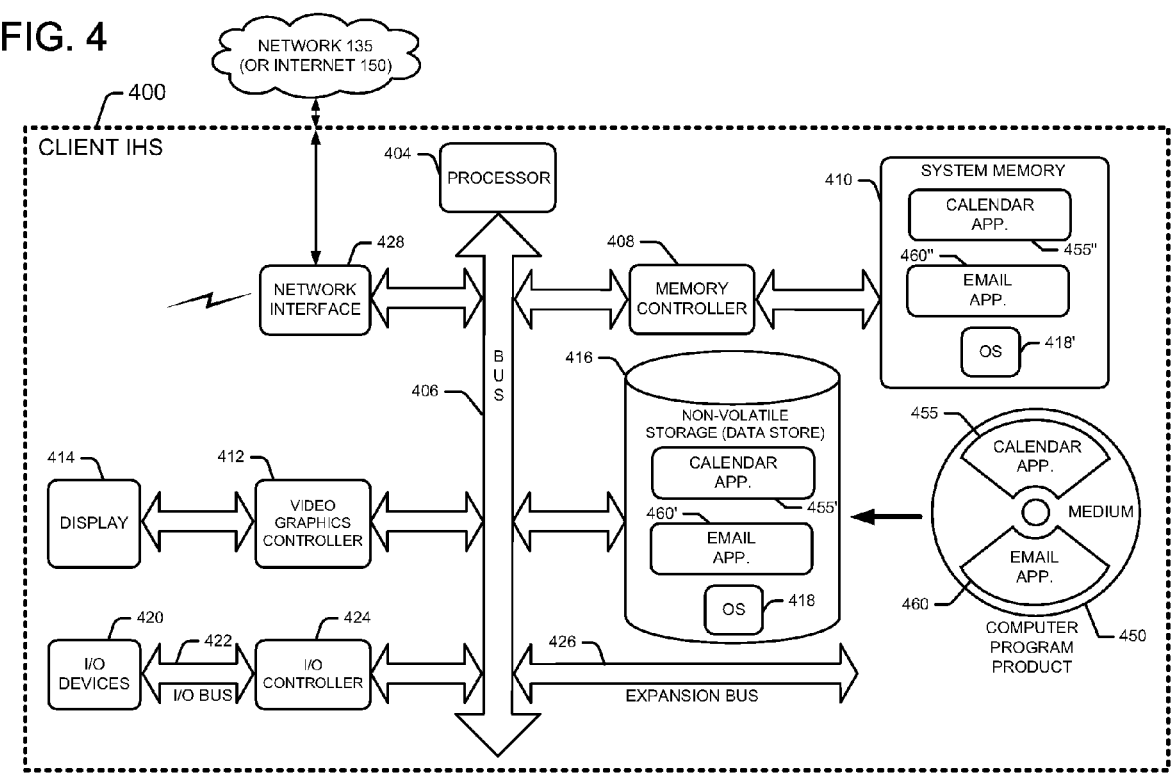
FIG. 4 is a block diagram of an information handling system (IHS) that the calendar system of FIG. 1 may employ as a client IHS.

FIG. 4 shows an information handling system (IHS) 400 that system 100 may employ as internal client IHSs 111, 112, 113, . . . N and external client IHSs 171 and 172. Internal client IHSs are client IHSs that are internal to organization or business entity 105, whereas external client IHSs are client IHSs that are external to organization or business entity 105. System 100 may also employ IHS 400 as calendar server IHS 130. This particular example discusses using client IHS 400 as client IHS 112, but applies to the other client IHSs as well. In one instance, client IHS 112 may be the calendar owner and client IHS 172 may be a calendar requester. In other instances, these roles may switch and client IHS 172 may be the calendar owner and client IHS 112 may be the calendar requester. Client IHS 400 includes a processor 404 that couples to a bus 406. A memory controller 408 couples system memory 410 to bus 406. A video graphics controller 412 couples display 414 to bus 406. Client IHS 400 includes nonvolatile storage 416, such as a hard disk drive, CD drive, DVD drive, or other nonvolatile storage that couples to bus 406 to provide client IHS 400 with permanent storage of information. Nonvolatile storage 416 is a form of data store. An operating system (OS) 418 loads from nonvolatile storage 416 to memory 410 as OS 418' to govern the operation of client IHS 400. I/O devices 420, such as a keyboard and a mouse pointing device, couple via I/O bus 422 and I/O controller 424 to bus 406. One or more expansion busses 426, such as USB, IEEE 1394 bus, ATA, SATA, PCI, PCIE and other busses, couple to bus 406 to facilitate the connection of peripherals and devices to client IHS 400. A network interface 428 couples to bus 406 to enable client IHS 400 to connect by wire or wirelessly to network 135/Internet 150 and other client and server IHSs. Network 135 may be a local area network (LAN), a wide area network (WAN), an internet protocol (IP) network, or other connective apparatus. Client IHS 400 may take many forms. For example, client IHS 400 may take the form of a desktop, server, portable, laptop, notebook, or other form factor computer or data processing system. Client IHS 400 may also take other form factors such as a personal digital assistant (PDA), a gaming device, a portable telephone device, a communication device or other devices that include a processor and memory.

Client IHS 400 may employ a compact disk (CD), digital versatile disk (DVD), floppy disk, external hard disk or virtually any other digital storage medium as medium 450. Medium 450 stores a calendar application 455 and an email application 460 thereon as a computer program product. When the user installs calendar application 455 and email application 460 on a client IHS, then the client aspects of these applications install and activate. When the user or technician installs calendar application 455 and email application 460 on a server IHS such as server IHS 130, then the server aspects of these applications install and activate. Referring now to the installation of calendar application 455 and email application 460 as client applications on client IHS 112, a user or other entity loads medium 450 into nonvolatile storage 416 and installs calendar application 455 as client calendar application 122. Email application 460 also installs as client email application 162. The designation, client calendar application 455', describes client calendar application 455 after installation on client IHS 400. The designation, client calendar application 455", describes client calendar application 455 after client IHS 400 loads the client calendar application into system memory 410 for execution. The designation, client email application 460', describes client email application 460 after installation on client IHS 400. The designation, client email application 460", describes client email application 460 after client IHS 400 loads the client calendar application into system memory 410 for execution.

Figure 5A:
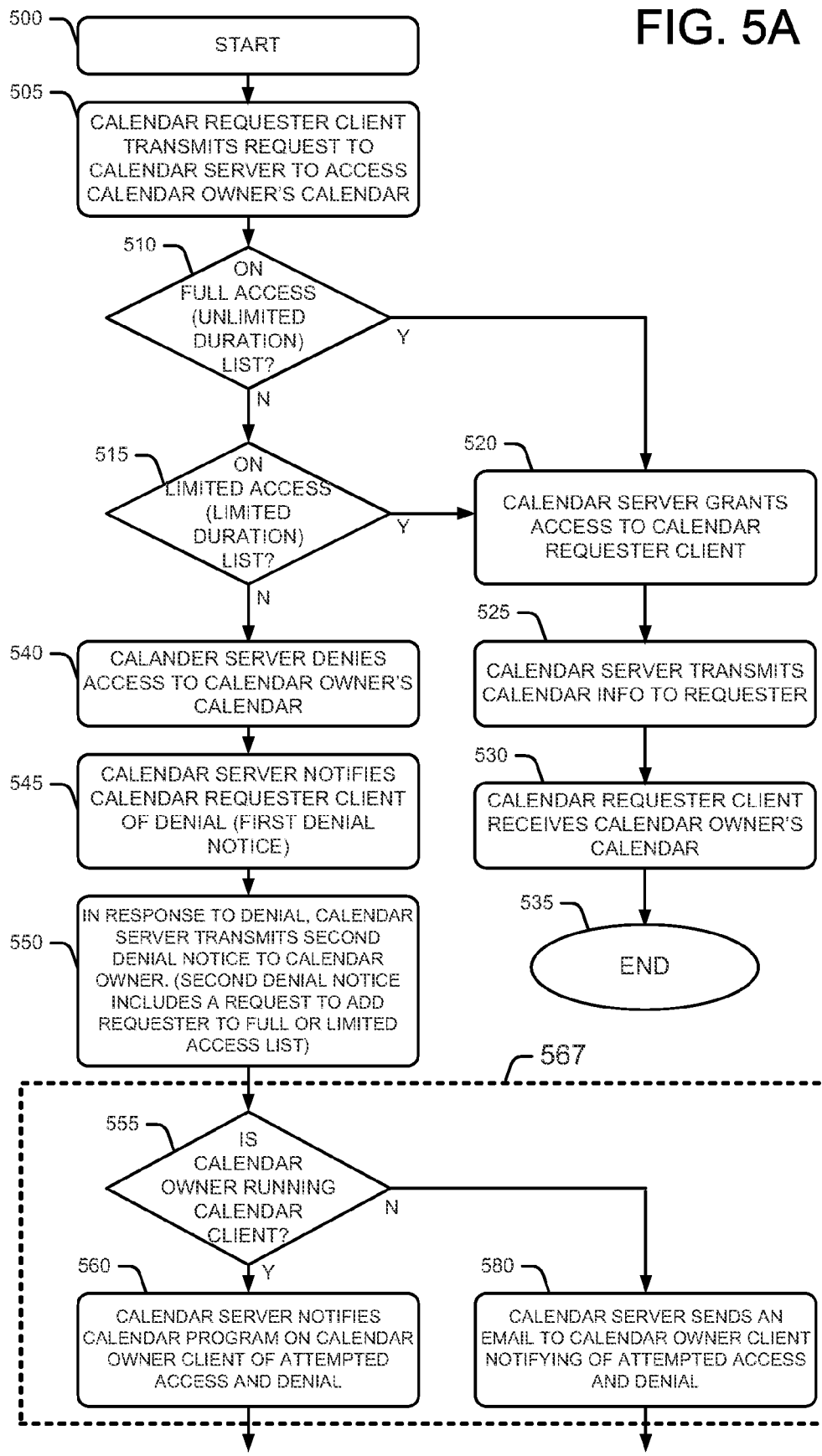
FIGS. 5A-5B together form a flow chart that depicts one embodiment of the calendaring methodology that the disclosed calendar system employs.
Figure 5B:
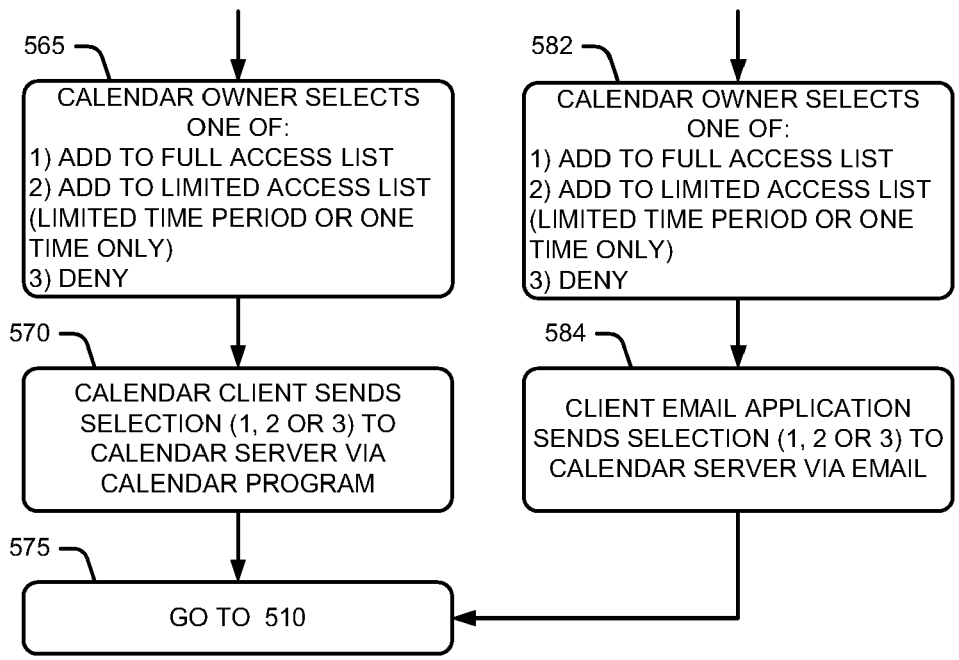

FIG. 5A-5B together depict a flow chart of a representative process flow for one embodiment of the disclosed electronic calendar access control methodology. This flow chart includes aspects that a requester client IHS 172 executes, aspects that server IHS 130 executes and aspects that calendar owner client IHS 112 executes. Process flow commences at start block 500. The calendar requester client IHS 172 transmits a request to calendar server IHS 130 for access to a particular calendar owner's calendar, for example the calendar owner of client IHS 112, as per block 505. Client calendar application 182 transmits this request. Server calendar application 137 of server IHS 130 receives this request for calendar access. Server calendar application 137 conducts a test to determine if full access list 195 includes the requester's name, as per decision block 510. If the current full access list 195 includes the particular requester's name, then server calendar application 137 grants access to the calendar owner's calendar, as per block 520. Server calendar application 137 transmits the calendar owner's calendar information to calendar requester client IHS 172, as per block 525. The client calendar application 182 of requestor client IHS 172 receives the calendar information, as per block 530. Requester client IHS 172 displays the calendar information for use by the requester. Process flow ends at end block 535.

Returning to decision block 510, if the requester's name is not on the full access list 195, then process flow continues to decision block 515 where server calendar application 137 conducts a test to determine if limited access list 197 includes the requester's name. If the test determines that limited access list 197 includes the requester's name, then server calendar application 137 grants access to the calendar owner's calendar, as per block 520. Process flow then continues to blocks 525, 530 and 535 in the same manner as the full access case discussed above.

However, if decision block 515 determines that the requester's name is not on the limited access list 197, server calendar application 137 denies access to the calendar owner's calendar, as per block 540. Server calendar application 137 notifies the calendar requester client of the denial with a first denial notice, as per block 545. In other words, server calendar application 137 transmits a denial notice to client calendar application 182 of requester client IHS 172. Requester client IHS 172 displays this denial notice to the requester.

In response to this denial of access, server calendar application 130 transmits a second denial notice to the calendar owner, namely the calendar owner of client IHS 112 in this particular example, as per block 550. The second denial notice that server calendar application 130 transmits includes a request to add the requester's name to full access list 195 or limited access list 197. Subsequent blocks 555, 560 and 565 inside dashed portion 567 include representative blocks for carrying out the function of "transmit second denial notice" block 550. In more detail, the dashed portion 567 of the flowchart includes a decision block 555 wherein the server calendar application 137 tests to determine if calendar owner client IHS 112 is currently running client calendar application 122. If decision block 555 determines that calendar owner client IHS 112 is currently running client calendar application 122, then server calendar application 137 notifies client calendar application 122 of the attempted access and denial of such access, as per block 560. In one embodiment, server calendar application 137 sends a second denial notice such as notice 340 of FIG. 3D to client calendar application 122 of calendar owner client IHS 112. The client calendar application 122 receives and displays the second denial notice 340. The calendar owner of client IHS 112 then selects one of the three options that the second denial notice 340 provides, as per block 565 of FIG. 5B. The calendar owner may select option number 1 to add the requester's name to full access list 195. Alternatively, the calendar owner may select option number 2 to add to the requester's name to limited access list 197. The calendar owner may select option number 3 to deny access of the calendar requester to the calendar owner's calendar. After the calendar owner selects one of these three options, client calendar application 122 sends the selection to server calendar application 137 of the server IHS 130, as per block 570. Server calendar application 137 updates full access list 195 or limited access list 197 depending on the calendar owner's option selection. As "GO TO 510" block 575 indicates, process flow continues back to decision block 510 that tests again to determine if the requester's name is now in full access list 195. Process flow then continues with either granting or denying access as already described above.

Returning to decision block 555 within dashed flowchart portion 567, if server calendar application 137 determines that calendar owner client IHS 112 is not running client calendar application 122, then calendar server IHS 130 sends an e-mail message to calendar owner client IHS 112 to notify the calendar owner of the attempted access by the requester and the denial thereof, as per block 580. This email notice acts as the second denial notice 340 and offers the same three options already discussed above with respect to notice 340. The calendar owner may select one of these three options directly from the email notice itself, as per block 582. In other words the e-mail notice displays, and the calendar owner may select, an option 1 that adds the requester to full access list 195, an option 2 that adds the requester to limited access list 197, or an option 3 that denies access to the calendar owner's calendar. The client email application 162 then sends the selection (1, 2 or 3) to server calendar application 137 via email, as per block 584. Process flow then continues via block 575 back to decision block 510 of FIG. 5 that tests again to determine if the requester's name is now in full access list 195. Process flow then continues with either granting or denying access as already described above. This methodology is dynamic because it not only grants access to requester names that full access list 195 and limited access list 197 already store, but also allows the dynamic addition of requester names to full access list 195 and limited access list 197 when the calendar owner receives a second denial notice and chooses one of the first two options.

Figure 5C:
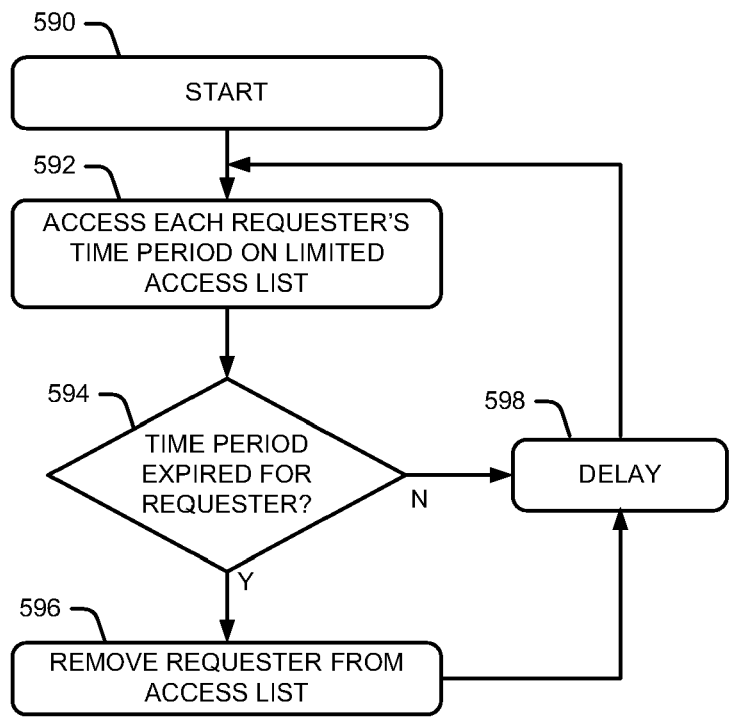
FIG. 5C is a flowchart for a subprocess of the methodology of FIGS. 5A-5B.

FIG. 5C is a flowchart that depicts a sub-process that may execute in parallel with the methodology of the flowchart of FIGS. 5A-5B. The function of this sub-process is to assure that limited access list 197 is up-to-date. In other words, if a particular requester receives a grant of calendar access for 1 month, then when the month expires the sub-process removes that requester's name from limited access list 197. In general terms, if a particular requester receives a grant of calendar access for a predetermined time period, then the sub-process of FIG. 5C checks periodically to determine if a particular requester's access expired. If a particular requester's access expired, then in response, the sub-process removes that requester from limited access list 197. In the case of a grant of one-time-only access, the sub-process checks to determine if the requester accessed the calendar one time, and if so then removes that requester from limited access list 197. In more detail, the sub-process commences at start block 590 of FIG. 5C. Server calendar application 137 accesses each requester name that limited access list 197 stores and also accesses the respective predetermined time period of access grant for each requester name. Server calendar application 137 then performs a test for each requester name in limited access list 197 to determine if each requester's predetermined time period of calendar access grant expired, as per decision block 594. When a particular requester's access grant time period expires, server calendar application 137 removes that requester's name from limited access list 197, as per block 596. The sub-process of server calendar application then waits for a delay time period at delay block 598 and the sub-process starts again at block 592. If at decision block 594 the sub-process determines that the calendar access time period of a particular requester name did not expire, then the sub-process waits at delay block 598 and the sub-process starts again at block 592. In this manner, server calendar application 137 maintains the currency and accuracy of limited access list 197.

Those skilled in the art will appreciate that the various structures disclosed can be implemented in hardware or software. Moreover, the methodology represented by the blocks of the flowchart of FIG. 5A-5C may be embodied in a computer program product, such as a media disk, media drive or other media storage such as computer program product medium 450 of FIG. 4.

In one embodiment, the disclosed methodology is implemented as a client calendar application, a server calendar application and an email application, namely sets of instructions (program code) in a code module which may, for example, be resident in system memory 410 of client IHS 400 of FIG. 4. Until required by IHS 400, the set of instructions may be stored in another memory, for example, non-volatile storage 416 such as a hard disk drive, or in a removable memory such as an optical disk or floppy disk, or downloaded via the Internet or other computer network. Thus, the disclosed methodology may be implemented in a computer program product for use in a computer such as IHS 400. It is noted that in such a software embodiment, code that carries out the functions depicted in the FIG. 5A-5C flow chart may be stored in system memory 410 while such code is being executed. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

The foregoing discloses a methodology and apparatus for dynamically controlling access to an electronic calendar.

Modifications and alternative embodiments of this invention will be apparent to those skilled in the art in view of this description of the invention. Accordingly, this description teaches those skilled in the art the manner of carrying out the invention and is intended to be construed as illustrative only. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

We claim:

1. A method of accessing a calendar, comprising:
    transmitting to a calendar server, by a calendar requester client of a calendar requester, a first request for access to a calendar of a calendar owner that is stored on the calendar server;
    transmitting to the calendar requester client, by the calendar server, a grant notice that the first request for access is granted if the calendar requester is included in one of a full access list associated with the calendar owner and a limited time duration access list associated with the calendar owner;
    transmitting to the calendar requester client, by the calendar server, a first denial notice that the first request for access is denied if the calendar requester is not included in one of the full access list associated with the calendar owner and the limited time duration access list associated with the calendar owner, the calendar server checking the limited time duration access list for inclusion of the calendar requester in response to the calendar server determining that the calendar requester is not included in the full access list; and
    transmitting a second denial notice to a calendar owner client, by the calendar server in response to transmitting the first denial notice to the calendar requester client, the second denial notice including a second request for access to the calendar of the calendar owner.

2. The method of claim 1, wherein the grant notice comprises a grant access window showing the calendar owner's calendar.

3. The method of claim 1, further comprising receiving, by the calendar owner client, the second request for access to the calendar of the calendar owner.

4. The method of claim 3, further comprising selecting, by the calendar owner client, one of granting access to the calendar owner's calendar for an unlimited period of time by adding the calendar requester to the full access list, granting access to the calendar owner's calendar for a limited period of time by adding the calendar requester to the limited time duration access list, and denying access to the calendar owner's calendar.

5. A calendar system comprising:
    a calendar owner client associated with a calendar owner;
    a calendar server, coupled to the calendar owner client, that stores a calendar of the calendar owner;
    a calendar requester client, coupled to the calendar server, the calendar requester client being associated with a calendar requester and being configured to transmit a first request for access to the calendar of the calendar owner that is stored on the calendar server;
    the calendar server being configured to transmit to the calendar requester client a grant notice that the first request for access is granted if the calendar requester is included in one of a full access list associated with the calendar owner and a limited time duration access list associated with the calendar owner,
    the calendar server being further configured to transmit to the calendar requester client a first denial notice that the first request for access is denied if the calendar requester is not included in one of the full access list associated with the calendar owner and the limited time duration access list associated with the calendar owner, the calendar server checking the limited time duration access list for inclusion of the calendar requester in response to the calendar server determining that the calendar requester is not included in the full access list,
    the calendar server being still further configured to transmit a second denial notice to the calendar owner client in response to transmitting the first denial notice to the calendar requester client, the second denial notice including a second request for access to the calendar of the calendar owner.

6. The calendar system of claim 5, wherein the grant notice includes a grant access window showing calendar information of the calendar owner.

7. The calendar system of claim 5, wherein the calendar owner client is configured to receive the second request for access to the calendar of the calendar owner.

8. The calendar system of claim 7, wherein the calendar owner client is configured to allow the calendar owner to select one of granting access to the calendar owner's calendar for an unlimited period of time by adding the calendar requester to the full access list, granting access to the calendar owner's calendar for a limited period of time by adding the calendar requester to the limited time duration access list, and denying access to the calendar owner's calendar.

9. A computer program product stored on a computer operable medium for controlling access to a calendar of a calendar owner, the computer program product comprising:
  first instructions that transmit to a calendar server, by a calendar requester client, a first request for access to a calendar of a calendar owner that is stored on the calendar server;
  second instructions that transmit to the calendar requester client, by the calendar server, a grant notice that the first request for access is granted if the calendar requester client is included in one of a full access list associated with the calendar owner and a limited time duration access list associated with the calendar owner;
  third instructions that transmit to the calendar requester client, by the calendar server, a first denial notice that the first request for access is denied if the calendar requester is not included in one of the full access list associated with the calendar owner and the limited time duration access list associated with the calendar owner, the calendar server checking the limited time duration access list for inclusion of the calendar requester in response to the calendar server determining that the calendar requester client is not included in the full access list; and
  fourth instructions that transmit a second denial notice to the calendar owner client, by the calendar server, in response to transmitting the first denial notice to the calendar requester client, the second denial notice including a second request for access to the calendar of the calendar owner.

10. The computer program product of claim 9, wherein the grant notice comprises a grant access window showing the calendar owner's calendar.

11. The computer program product of claim 9, further comprising instructions for receiving, by the calendar owner client, the second request for access to the calendar of the calendar owner.

12. The computer program product of claim 11, further comprising instructions for selecting, by the calendar owner client, one of granting access to the calendar owner's calendar for an unlimited period of time by adding the calendar requester to the full access list, granting access to the calendar owner's calendar for a limited period of time by adding the calendar requester to the limited time duration access list, and denying access to the calendar owner's calendar.

* * * * *